(12) United States Patent
Kim et al.

(10) Patent No.: US 8,532,475 B2
(45) Date of Patent: Sep. 10, 2013

(54) CAMERA MODULE

(75) Inventors: Yong Gu Kim, Seoul (KR); Sang Jin Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 101 days.

(21) Appl. No.: 13/108,411

(22) Filed: May 16, 2011

(65) Prior Publication Data

US 2011/0286737 A1 Nov. 24, 2011

(30) Foreign Application Priority Data

May 18, 2010 (KR) .................. 10-2010-0046497

(51) Int. Cl.
*G03B 17/08* (2006.01)
*G02B 23/16* (2006.01)
*G02B 7/02* (2006.01)

(52) U.S. Cl.
USPC .............. 396/25; 396/533; 359/513; 359/829

(58) Field of Classification Search
USPC ..................... 396/533, 529, 25, 29; 348/340; 359/507, 513, 819, 829
See application file for complete search history.

(56) References Cited

U.S. PATENT DOCUMENTS

2005/0248684 A1* 11/2005 Machida ....................... 348/373

FOREIGN PATENT DOCUMENTS

JP 2008-040349 A 2/2008

OTHER PUBLICATIONS

European Search Report dated Sep. 8, 2011 issued by the EPO with regard to corresponding patent application No. EP 11-16-4028.

* cited by examiner

*Primary Examiner* — Rochelle-Ann J Blackman
(74) *Attorney, Agent, or Firm* — Ladas & Parry, LLP

(57) ABSTRACT

Disclosed herein is a camera module, including: a lens barrel having a plurality of lenses embedded therein to collect images of external subjects; a housing receiving the lens barrel; a sealing member provided between the lens barrel and the housing to seal a space therebetween; and a bonding part performing bonding treatment on a space between the lens barrel and the sealing member.

7 Claims, 3 Drawing Sheets

CAMERA MODULE

CROSS REFERENCE TO RELATED APPLICATION

This application claims the benefit of Korean Patent Application No. 10-2010-0046497, filed on May 18, 2010, entitled "Camera Module," which is hereby incorporated by reference in its entirety into this application.

BACKGROUND OF THE INVENTION

1. Technical Field

The embodiment relates to a camera module.

2. Description of the Related Art

Recently, a camera module generally has a structure in which a lens and a housing are assembled by a screw and then, the circumference of the lens is fixed by bonding.

However, there are many defects in the camera module having the above structure, for example, the absorption of liquid from the outside due to a clearance caused by fixing portions.

Further, after the lens is assembled with the housing, it is very difficult to control a bonding process during a process of assembling components at the outside thereof by using bonding and the assembling structure of the camera having mounted electrical devices, etc., on the outside thereof.

Therefore, research into a structure of a camera module capable of effectively preventing foreign materials and liquid from being absorbed thereinto when the housing is assembled with the lens has been actively conducted.

SUMMARY OF THE INVENTION

The present invention has been made in an effort to provide a camera module capable of completely sealing a housing and a lens during the assembly thereof.

According to a preferred embodiment of the present invention, there is provided a camera module, including: a lens barrel having a plurality of lenses embedded therein to collect images of external subjects; a housing receiving the lens barrel; a sealing member provided between the lens barrel and the housing to seal a space therebetween; and a bonding part performing bonding treatment on a space between the lens barrel and the sealing member.

The outer peripheral surface of the lens barrel may be provided with a screw thread and the inner peripheral surface of the sealing member may be provided with a screw groove to be engaged with the screw thread.

The sealing member may be made of a silicon material or a rubber material.

The sealing member and the housing may be selectively provided with a screw thread and a screw groove to be engaged with each other.

The sealing member and the housing may be integrally formed with each other.

DESCRIPTION OF THE PREFERRED EMBODIMENTS

Figure 1:
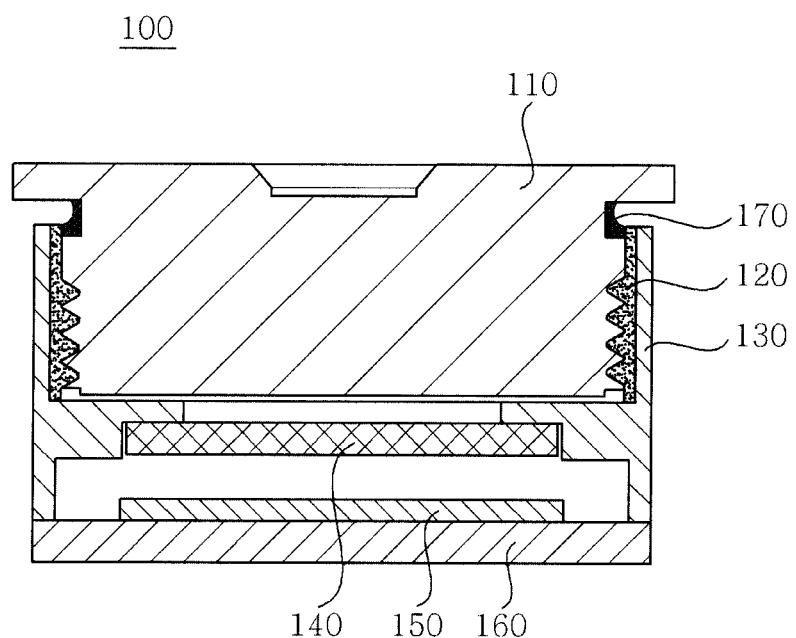
FIG. 1 is an overall cross-sectional view of a camera module according to a preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
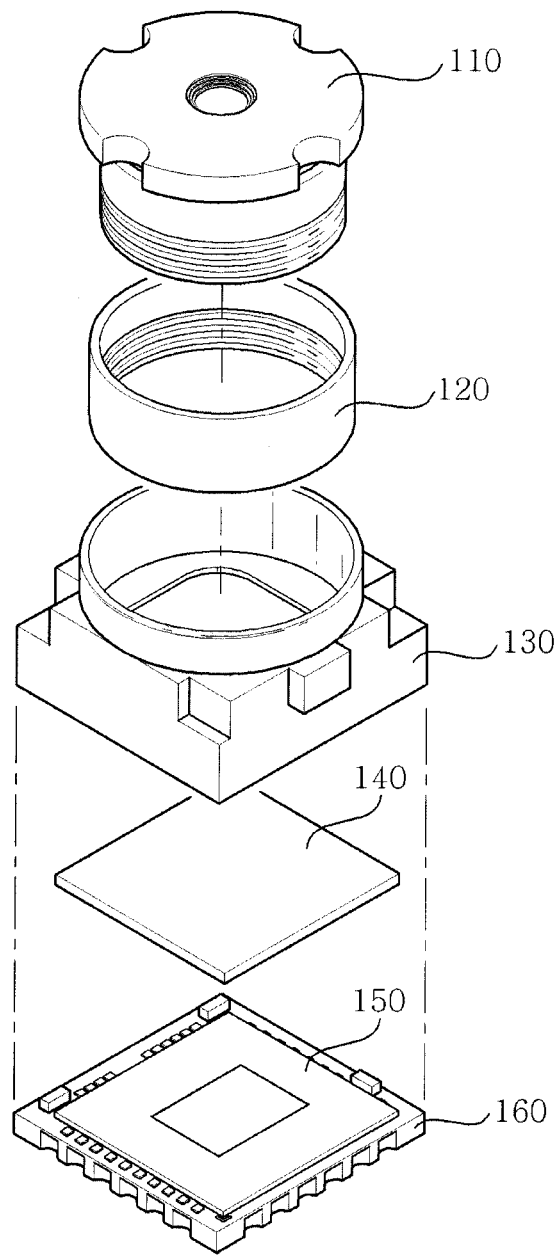
FIG. 2 is an exploded perspective view of a camera module according to an embodiment of the present invention.
Figure 3:
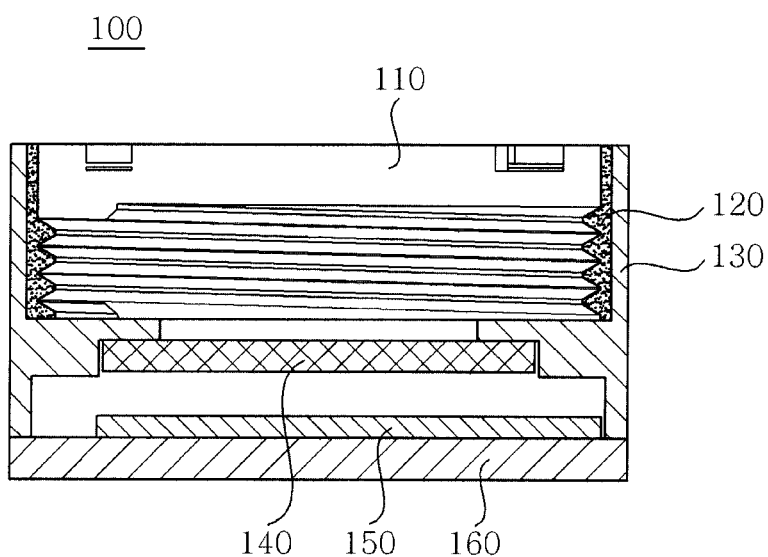
FIG. 3 is a partially cross-sectional view of a camera module according to a preferred embodiment of the present invention.

FIG. 1 is an overall cross-sectional view of a camera module according to a preferred embodiment of the present invention, FIG. 2 is an exploded perspective view of a camera module according to an embodiment of the present invention, and FIG. 3 is a partially cross-sectional view of a camera module according to a preferred embodiment of the present invention.

As shown in FIGS. 1 to 3, a camera module 100 according to a preferred embodiment of the present invention may be configured to include a lens barrel 110, a sealing member 120, a housing 130, an IR filter 140, an image sensor 150, and a circuit board 160.

The lens barrel 110 is configured to include a plurality of lenses embedded therein, which collects external objects into the image sensor 150 in the camera module. Meanwhile, the sealing member 120 is combined with the outside of the lens barrel 110 by a screw thread formed on the outer peripheral surface of the lens barrel 110.

The sealing member 120 is included between the lens barrel 110 and the housing 130, which is a combining member to completely seal a space between the lens barrel 110 and the housing 130.

The sealing member 120 prevents foreign materials and liquid from being introduced into the space between the lens barrel 110 and the housing 130 and the inside of the sealing member 120 is provided with a screw groove to be combined with the screw thread formed on the outside of the lens barrel 110.

The sealing member 120 may be made of a material as long as it performs a waterproof function and a foreign material intercepting function such as a silicon material, a rubber material, or the like, in order to have a waterproof effect that does not break down the camera even if the camera falls into water, by preventing foreign materials and liquid from being introduced into the camera.

The housing 130 is combined with the outside of the sealing member 120 so as to be fixedly combined with the circuit board 160 while supporting the lens barrel 110, thereby protecting the image sensor 150. The housing 130 may be provided to be integrated with the sealing member 120 and may be combined with the screw thread formed on the outer peripheral surface of the sealing member by the screw groove formed on the inner peripheral surface thereof.

The IR filter 140 is to intercept infrared rays. That is, the IR filter is fixedly mounted on the housing 130 to intercept infrared rays to pass only visible rays recognized by the image sensor 150. The IR filter 140 may be attached to the rear of the lens barrel 110 or to the top surface of the lens barrel 110.

The image sensor 150 is to convert external images transferred through the lens barrel 110 into electrical signals and is electrically connected to one side of the circuit board 160 through a wire bonding (not shown).

The circuit board 160 is to transmit the electrical signals generated from the image sensor 150 to electronic devices such as a camera phone, or the like. The top surface of the circuit board 160 is provided with circuits that are electrically connected to the image sensor 150 and various kinds of passive devices.

As described above, after the camera module 100 is assembled, a bonding part 170 performing bonding treatment by an adhesive is formed between the space between the lens barrel 110 and the sealing member 120.

The bonding part 170 seals the entire micro space between the lens barrel 110 and the sealing member 120 to previously prevent foreign materials and liquid from being penetrated into the camera.

FIG. 2 is an exploded perspective view of the camera module 100 according to the preferred embodiment of the present invention. The sealing member 120 according to the preferred embodiment of the present invention is provided between the lens barrel 110 and the housing 130, thereby preventing foreign materials and liquid from being penetrated into the camera.

The inner peripheral surface of the sealing member 120 is provided with a screw groove to be engaged with the screw thread formed on the outer peripheral surface of the lens barrel 110. In addition, the sealing member 120 may be formed by dual injection or insert injection.

FIG. 3 is a partially cross-sectional view of the camera module 100 according to the preferred embodiment of the present invention. FIG. 3 shows that the outer peripheral surface of the lens barrel 110 is engaged with the inner peripheral surface of the sealing member 120 by the screw thread.

As described above, the camera module 100 including the sealing member 120 can prevent foreign materials and liquid from being introduced from the outside beforehand by fastening the lens barrel 110 and is very effective for the camera module such as the electrical devices mounted on the outside thereof, thereby making it possible to considerably improve the reliability of the camera.

As set forth above, the camera module has the structure including the sealing member between the lens barrel and the housing. The structure can previously prevent foreign materials and liquid from being introduced from the outside by fastening the lens barrel and is very effective for the camera module such as the electrical devices mounted on the outside thereof, thereby making it possible to considerably improve the reliability of the camera.

Although the preferred embodiments of the present invention have been disclosed for illustrative purposes, they are for specifically explaining the present invention and thus the camera module according to the present invention is not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A camera module, comprising:
    a lens barrel having a plurality of lenses embedded therein to collect images from external subjects;
    a housing receiving the lens barrel;
    a sealing member provided between the lens barrel and the housing to seal a space therebetween; and
    a bonding part performing bonding treatment on a space between the lens barrel and the sealing member.

2. The camera module as set forth in claim 1, wherein the outer peripheral surface of the lens barrel is provided with a screw thread and the inner peripheral surface of the sealing member is provided with a screw groove to be engaged with the screw thread.

3. The camera module as set forth in claim 1, wherein the sealing member is made of a silicon material or a rubber material.

4. The camera module as set forth in claim 1, wherein the sealing member and the housing are selectively provided with a screw thread and a screw groove to be engaged with each other.

5. The camera module as set forth in claim 1, wherein the sealing member and the housing are integrally formed with each other.

6. A camera module, comprising:
    a lens barrel having a plurality of lenses embedded therein to collect images from external subjects;
    a housing receiving the lens barrel;
    a sealing member provided between the lens barrel and the housing to seal a space therebetween; and
    a bonding part performing bonding treatment on a space between the lens barrel and the sealing member to be sealed,
    wherein the outer peripheral surface of the lens barrel is provided with a screw thread and the inner peripheral surface of the sealing member is provided with a screw groove to be engaged with the screw thread, and
    wherein the sealing member is made of a silicon material or a rubber material.

7. The camera module as set forth in claim 6, wherein the sealing member and the housing are integrally formed with each other.

* * * * *